United States Patent
Brzoska

(10) Patent No.: US 9,109,706 B2
(45) Date of Patent: Aug. 18, 2015

(54) COKING DRUM

(71) Applicant: Z & J Technologies GmbH, Dueren (DE)

(72) Inventor: Ekkehard Brzoska, Muelheim (DE)

(73) Assignee: Z & J Technologies GmbH, Dueren (DE)

( * ) Notice: Subject to any disclaimer, the term of this patent is extended or adjusted under 35 U.S.C. 154(b) by 173 days.

(21) Appl. No.: 13/753,232

(22) Filed: Jan. 29, 2013

(65) Prior Publication Data
US 2013/0199967 A1   Aug. 8, 2013

(30) Foreign Application Priority Data

Feb. 8, 2012   (DE) .......................... 10 2012 101 015

(51) Int. Cl.
| | | |
|---|---|---|
| C10B 43/00 | (2006.01) | |
| F16K 3/00 | (2006.01) | |
| C10B 1/04 | (2006.01) | |
| C10B 25/10 | (2006.01) | |
| C10B 55/00 | (2006.01) | |
| F16K 3/02 | (2006.01) | |

(52) U.S. Cl.
CPC ... *F16K 3/00* (2013.01); *C10B 1/04* (2013.01); *C10B 25/10* (2013.01); *C10B 55/00* (2013.01); *F16K 3/0209* (2013.01)

(58) Field of Classification Search
CPC ........ C10B 25/10; C10B 33/02; C10B 41/00; C10B 9/06
USPC ........................... 202/241, 242, 244, 245, 262
See application file for complete search history.

(56) References Cited

U.S. PATENT DOCUMENTS

| | | | | |
|---|---|---|---|---|
| 5,116,022 | A  * | 5/1992  | Genreith et al. | ............... 251/175 |
| 6,660,131 | B2 * | 12/2003 | Lah | ............................... 202/245 |
| 7,115,190 | B2   | 10/2006 | Lah | |
| 7,600,528 | B2 * | 10/2009 | Brzoska et al. | ............... 137/241 |
| 7,666,280 | B2 * | 2/2010  | Kersternich | ................... 202/241 |
| 7,727,382 | B2   | 6/2010  | Sparks et al. | |
| 7,799,177 | B2 * | 9/2010  | Oder et al. | ....................... 201/41 |
| 8,413,956 | B2 * | 4/2013  | Zingsem et al. | ............... 251/197 |
| 2003/0127314 | A1 * | 7/2003 | Bell et al. | ....................... 202/262 |
| 2004/0238408 | A1   | 12/2004 | Malsbury | |

(Continued)

FOREIGN PATENT DOCUMENTS

| | | |
|---|---|---|
| CN | 200986033 Y | 12/2007 |
| CN | 201077829 Y | 6/2008 |

(Continued)

OTHER PUBLICATIONS

European Patent Office, Extended European Search Report for Application No. 13152686.5, dated May 6, 2013, 6 pages, The Netherlands.

(Continued)

*Primary Examiner* — Nina Bhat
(74) *Attorney, Agent, or Firm* — Alston & Bird LLP

(57) ABSTRACT

A coking drum is provided, especially for petroleum coke production, which has an approximately cylindrical basic body and also at least one inlet opening and outlet opening, a shut-off valve (1, 1') being arranged at the outlet opening and/or inlet opening. The coking drum is characterized in that there is provided, at approximately the same height as the shut-off valve (1, 1'), at least one input opening (19, 19') for feeding residual materials, especially from a vacuum distillation process upstream of the coking, into the coking drum.

12 Claims, 3 Drawing Sheets

(56) References Cited

U.S. PATENT DOCUMENTS

2007/0251576 A1* 11/2007 Lah et al. .................. 137/15.06
2010/0252409 A1    10/2010 Lah

FOREIGN PATENT DOCUMENTS

| EP | 1516908 | B1 | 12/2008 |
| WO | WO 03/104353 | A1 | 12/2003 |
| WO | WO 2010/093763 | A2 | 8/2010 |

OTHER PUBLICATIONS

German Patent and Trademark Office, Office Action for Application No. 102012101015.3, mailed Oct. 24, 2012, 12 pages, Germany.

* cited by examiner

COKING DRUM

CROSS-REFERENCE TO RELATED APPLICATIONS

This application claims priority to and the benefit of German Application No. 10 2012 101 015.3, filed Feb. 8, 2012, the contents of which is hereby incorporated by reference herein.

BACKGROUND

1. Field of the Invention

The invention relates to a coking drum, to a shut-off valve for a coking drum, and to a method of feeding residual materials into a coking drum.

2. Description of the Related Art

In crude oil processing, importance is increasingly being placed on the further processing of heavy products left over from the distillation of crude oil to lighter products. Accordingly, the production of heavy heating oil is to be reduced and the production of gasoline, diesel fuel and light heating oil increased without the need to process additional crude oil. The plants required for that purpose, which operate according to various methods, are called conversion plants. They convert heavy, long hydrocarbon molecules into light, shorter hydrocarbon molecules by cracking the long molecules. A distinction is made between three such cracking methods: thermal cracking, catalytic cracking and hydrocracking. The optimum combination of methods depends on several factors which include, inter alia, the quality of the crude oil in question and the products desired. The various cracking methods are based on different feed products, gas oil from vacuum distillation acting as the feed product for catalytic cracking plants and hydrocrackers, and the residue from vacuum distillation being used as feed product in visbreakers or cokers.

The longest known and probably simplest cracking method is thermal cracking. In that method, hydrocarbon chains are cracked at high temperatures. The group of thermal cracking methods includes so-called visbreaking and coking in which carbon in solid form, so-called coke or petroleum coke, is deposited.

A distinction is made between three different methods of coking, namely so-called fluid coking, so-called delayed coking and so-called flexicoking. The most frequently used method is that of delayed coking. In the method, the feed product which, for example, may be the residue from vacuum distillation, is introduced into a furnace at a pressure of about 30 bar and heated to about 500° C. As a result of those conditions, it flows through the furnace at very high speed and then cokes when admitted into a coking chamber or coking drum having a prevailing chamber pressure of about 4 bar that is separate from the furnace and connected thereto by a pipeline.

There are generally associated with each furnace at least two coking drums, one or other of those chambers being in operation while coke is being removed from the other one. The coke can be cut out of the coking drum by means of, for example, water under high pressure. The light hydrocarbons produced during the coking process are conveyed from the coking chamber into a fractionating tower where they are further processed. The resulting petroleum coke is called green coke and, after comminution, can either be sold or further refined. Further refining takes place in a calcination process in which, at temperatures of 1200° C. and above, any oil constituents still present are burnt off and coked. The calcination product obtained in that process can then be utilized, for example, for electrodes which are used in the aluminum industry.

The particular drum that has been filled is cooled, and the coke is removed from it. For that purpose, water is first introduced into the drum in order to cool the hot coke obtained. The drum is then opened to the atmosphere by opening, depending on the design of the coking chamber or drum, either only the bottom end of the drum or also the top end of the drum or chamber, so that the coke can be cut out of the drum and delivered for further use.

The operation of opening the coking drum may present sources of risk for several reasons. The water introduced into the drum for cooling the coke prior to the drum being opened is very hot and, if the equipment is not handled carefully, may result in injuries caused by emerging hot water or steam, which is under pressure. In addition, loose pieces of coke may fall out of the drum or place such a strain on the opening mechanisms that, once they have been unlocked, they open abruptly, which may also result in injuries to the operating personnel. The operating personnel may also be exposed to dusts, especially coke particles, and also to irritant or toxic gases when the drums are opened.

In order to reduce the sources of risk to the operating personnel, a change was made from opening the coking drums manually to opening them automatically by means of dedicated, for example hydraulic, shut-off valves. Such a coking drum having a shut-off valve, which is in the form of a bridging-pipe gate valve, is known from EP 1 516 908 B1. The apparatus described in that publication is a coking drum in which there is arranged at an outlet and/or at an inlet a shut-off member in the form of a bridging-pipe gate valve, having two shut-off plates. Also, residual materials, especially from a vacuum distillation process upstream of the coking, are there fed into the coking drum through a feed opening which is provided at some distance above the shut-off valve in a side wall of the coking drum.

A drawback of that known coking drum is that a homogeneous temperature distribution and a uniform distribution of residual materials in the coking drum is not ensured.

The problem of the present invention is accordingly to provide a coking drum and shut-off valve and also a method which ensure improved feeding of residual materials into the coking drum so that, especially, a homogeneous temperature distribution is ensured in the coking drum during the coking process.

BRIEF SUMMARY

The problem is solved by a coking drum having the features of the claims provided herein. The coking drum according to the invention is used especially in petroleum coke production. It has an approximately cylindrical basic body and also at least one inlet opening and outlet opening, a shut-off valve being arranged at the outlet opening and/or inlet opening. The coking drum is characterized in that there is provided, at approximately the same height as the shut-off valve, at least one input opening for feeding residual materials, especially from a vacuum distillation process upstream of the coking, into the coking drum.

A fundamental aspect of the invention accordingly lies in the fact that the residual materials are introduced into the coking drum through the at least one input opening at approximately the same height as the shut-off valve, so that a uniform temperature distribution is ensured in the coking drum during the coking process. Preference is given to the at least one input opening being arranged in the shut-off valve.

As a result, especially central feeding of the residual materials into the coking drum can be carried out.

Furthermore, the shut-off valve can be in the form of a bridging-pipe gate valve. The bridging-pipe gate valve can be especially in the form of a single-plate gate valve having one shut-off plate or in the form of a double-plate gate valve having two parallel shut-off plates. When the shut-off valve is in the form of a single-plate gate valve, the input opening is preferably formed in the single shut-off plate so that residual materials can be introduced into the coking drum through the input opening. If, however, the shut-off valve is in the form of a double-plate gate valve, the at least one input opening for residual materials is formed in that shut-off plate which faces the outlet opening of the coking drum in order to ensure feeding of residual materials into the coking drum Preference is given to the at least one input opening being in communication with at least one feed channel arranged in the shut-off plate. In suitable manner, the at least one feed channel extends substantially parallel to the surface of the shut-off plate. The feed channel can be of tubular or like construction. In order to make possible feeding of residual materials, the at least one feed channel is preferably in communication with a vacuum distillation chamber which is upstream of the coking in the coking drum.

The above-mentioned problem is also solved by a shut-off valve. The shut-off valve is advantageously a bridging-pipe gate valve and is usually used in conjunction with a coking drum for petroleum coke production. In accordance with the invention, the shut-off valve has a feed device integrally formed in it for feeding residual materials into a coking drum connectible to the shut-off valve. The feed device comprises at least one feed opening and at least one feed channel in communication with the feed opening. With respect to the advantages of the shut-off valve according to the invention, reference is made to the above statements relating to the coking drum.

The above-mentioned problem is also solved by a method for feeding residual materials, especially from a vacuum distillation process upstream of the coking, into a coking drum connected to a shut-off valve. The method according to the invention is characterised by feeding the residual materials into the coking drum at approximately the same height as the shut-off valve. With respect to the advantages of the method according to the invention, reference is made to the above statements.

BRIEF DESCRIPTION OF THE SEVERAL VIEWS OF THE DRAWING(S)

The invention will be explained in greater detail hereinbelow with reference to the drawings, in which.

DETAILED DESCRIPTION OF VARIOUS EMBODIMENTS

Various embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Figure 1:
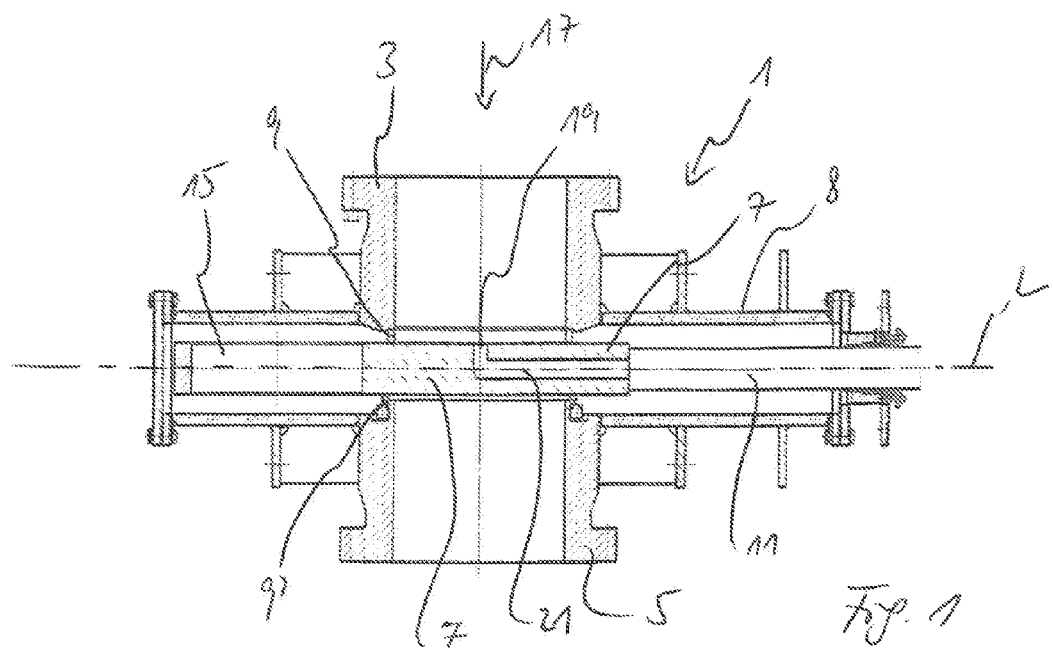
FIG. 1 shows, in diagrammatic form, a section through a shut-off valve according to the invention in the form of a single-plate gate valve.

FIG. 1 shows, in diagrammatic form, a section through a shut-off valve 1. The shut-off valve 1 is configured for connection to a coking drum (not shown in the Figure). For that purpose, the shut-off valve 1 has a cylindrical pipe stub 3. A further cylindrical pipe stub 5 is arranged opposite the pipe stub 3. When the shut-off valve 1 is used in the intended manner, the pipe stub 3 is usually connected to an outlet opening of a coking drum or coking chamber. Alternatively or also additionally, a shut-off valve 1 according to FIG. 1 can be connected to, especially flange-mounted on, an inlet opening of a coking drum.

In FIG. 1, the shut-off valve 1 is in the form of a bridging-pipe gate valve, which in turn is in the form of a single-plate gate valve. The shut-off valve 1 accordingly comprises a shut-off plate 7, which is mounted in a housing 8 of the shut-off valve 1 so as to be movable between the pipe stubs 3 and 5 along a longitudinal direction L of the shut-off valve 1. The shut-off valve 7 is sealed, with respect to the pipe stubs 3 and 5, by sealing elements 9, 9' of preferably annular construction, which are shown here merely by way of indication. Furthermore, movement of the shut-off plate 7 in the longitudinal direction L is brought about by means of an actuating rod 11, which co-operates with a suitable drive device (not shown in the Figure).

Arranged beside the shut-off plate 7 is a bridging pipe 15, which is connected to the shut-off plate 7 preferably by way of webs of material or the like, especially being integral therewith. The bridging pipe 15 is of hollow cylindrical construction and, in an open position of the shut-off valve 1, connects the pipe stubs 3 and 5 to one another without restricting the cross-section. When the shut-off valve 1 is in the open position (not shown in FIG. 1), the coke can, after the end of the coking process, be taken out of the coking drum through the outlet opening of the coking drum and onward through the pipe stub 3, the bridging pipe 15 and the pipe stub 5, in the direction of arrow 17.

FIG. 1 shows the closed position of the shut-off valve 1. In this position, the shut-off plate 7 blocks the through-connection between the two pipe stubs 3 and 5 so that no coke or residual material for coking can escape from the coking drum.

When the shut-off valve 1 is in the closed position, residual materials, especially from a vacuum distillation process upstream of the coking process, are taken into the coking drum. For that purpose, the shut-off valve 1 has an input opening 19, which is formed in the shut-off plate 7 and is consequently arranged at approximately the same height as that of the shut-off valve 1. The input opening 19 is introduced into that face of the shut-off plate 7 which, in the mounted state, faces the coking drum. The input opening 19 is preferably of circular construction and is in fluid communication with a feed channel 21 integrally constructed in the shut-off plate 7 in order to allow residual materials to be fed into the coking drum. The input opening 19 and the feed channel 21 are preferably of integral construction. In other words, both are arranged in the shut-off plate 7 and the one passes directly into the other.

The input opening 19 is preferably so arranged in the shut-off plate 7 that, in the closed state of the shut-off valve 1, as shown in FIG. 1, the input opening 19 is arranged substantially centrally in relation to the pipe stub 3. This ensures a central feed of residual materials and consequently an especially homogeneous distribution of the residual materials in the coking drum.

The feed channel 21 is arranged in the shut-off plate 7 substantially parallel to the surface of the latter, which surface in turn extends parallel to the longitudinal axis L of the shut-off valve 1. In the sectional view, the feed channel 21 is of L-shaped construction and can be of tubular or like construction. Also feasible in principle is a cross-sectional shape of the feed channel 21 which is other than circular. It will be understood that the diameter of the feed channel 21 is so matched to the thickness of the shut-off plate 7 and is so defined thereby perpendicular to the longitudinal direction L that the shut-off plate 7 still has sufficient stability in the region of the feed opening 19 and feed channel 21.

Figure 2:
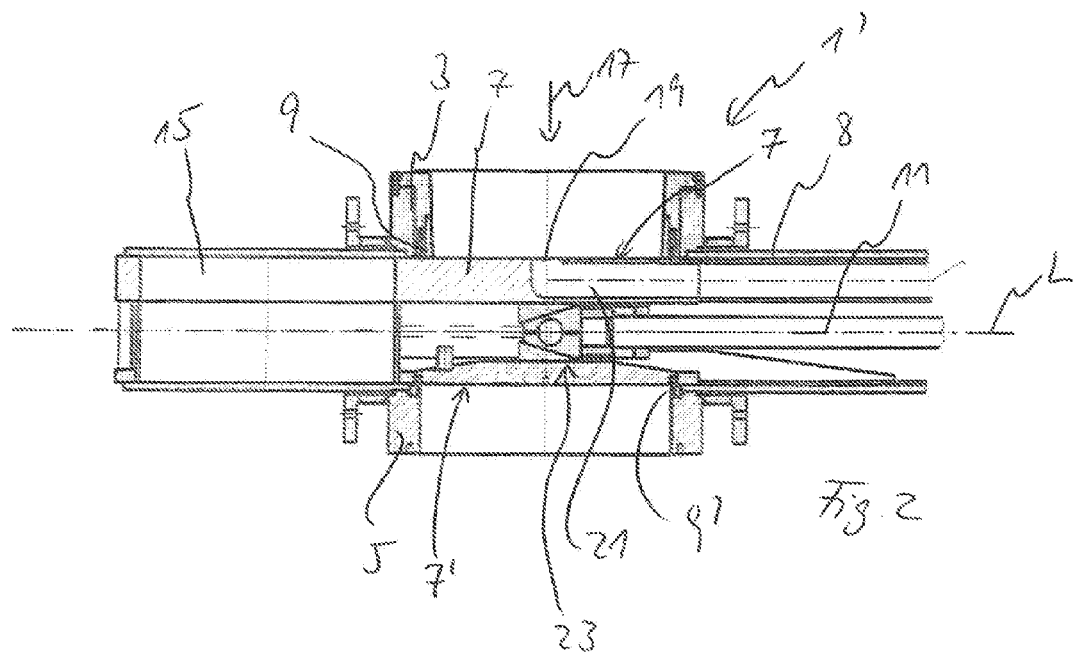
FIG. 2 shows, in diagrammatic form, a section through a shut-off valve according to the invention in the form of a double-plate gate valve.

FIG. 2 shows, in diagrammatic form, a section through a further shut-off valve 1'. Like parts are provided with the same reference numerals in order to avoid repetitions insofar as reference is made to the description relating to FIG. 1.

The shut-off valve 1' shown in FIG. 2 is likewise a so-called bridging-pipe gate valve, although this one is in the form of a double bridging gate valve. This means that the shut-off valve 1' has, instead of one shut-off plate 7, two shut-off plates 7 and 7' arranged substantially parallel to one another.

The two shut-off plates 7, 7' can be spread apart by means of an internal wedge 23 in accordance with a "wedge-in-wedge" principle, which prevents jamming of the shut-off plates even under difficult conditions. Such a principle has already been comprehensively described in the prior art and will therefore not be explained in greater detail herein.

The crucial aspect of a shut-off valve having two shut-off plates 7, 7' is that that shut-off plate 7 which faces the outlet opening of the coking drum has the input opening 19 for feeding residual materials into the coking drum. As also in the case of the shut-off valve 1 shown in FIG. 1, the input opening 19 of the shut-off valve 1' is in fluid communication with a feed channel 21, by way of which the residual materials are passed from a vacuum distillation chamber or the like into the coking drum.

Figure 3:
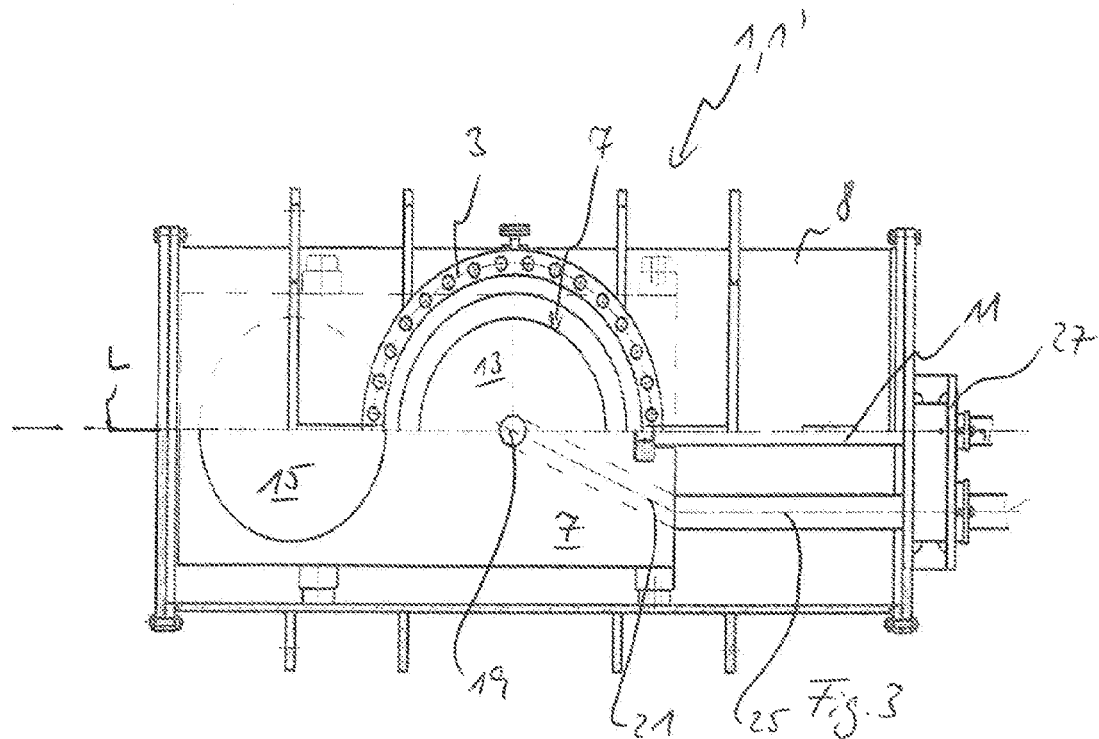
FIG. 3 shows, in diagrammatic form, a shut-off valve having an input opening and a feed channel in accordance with a first embodiment of the invention.

FIG. 3 shows, in diagrammatic form, a shut-off valve 1, 1' having an input opening 19 and a feed channel 21 according to a first embodiment of the invention. There are shown in the top half of the Figure a plan view of the shut-off valve 1, 1' and in the bottom half, in diagrammatic form, a section through the shut-off valve. The shut-off valve shown in FIG. 3 can be either a single-plate gate valve shown in FIG. 1 or a double-plate gate valve shown in FIG. 2. The crucial aspect is that the feed opening 19 is arranged at approximately the same height as the shut-off valve 1, 1' and it opens out into the coking drum.

FIG. 3 shows the shut-off valve 1, 1' in the closed position, that is to say the shut-off plate 7 blocks the through-opening between the two pipe stubs 3 and 5. In the shut-off plate 7 there is provided an input opening 19 which is centrally arranged when seen in relation to the circular cross-section of the pipe stub 3 and which is in communication with a feed channel 21 integrally formed in the shut-off plate 7. Starting from the input opening 19, the feed channel 21 extends in a radial direction relative to the circular cross-section of the pipe stub 3. The feed channel 21 in the shut-off plate 7 merges into a tube element 25 which extends substantially parallel to the actuating rod 11, but which is constructed separately from the latter.

The actuating rod 11 and the tube element 25 are mounted in a common holder 27 in or on the housing 8 of the shut-off valve 1, 1'. Otherwise, the feed channel 21 is, in respect of its residual material feed direction, arranged at an angle to the actuating rod 11.

Figure 4:
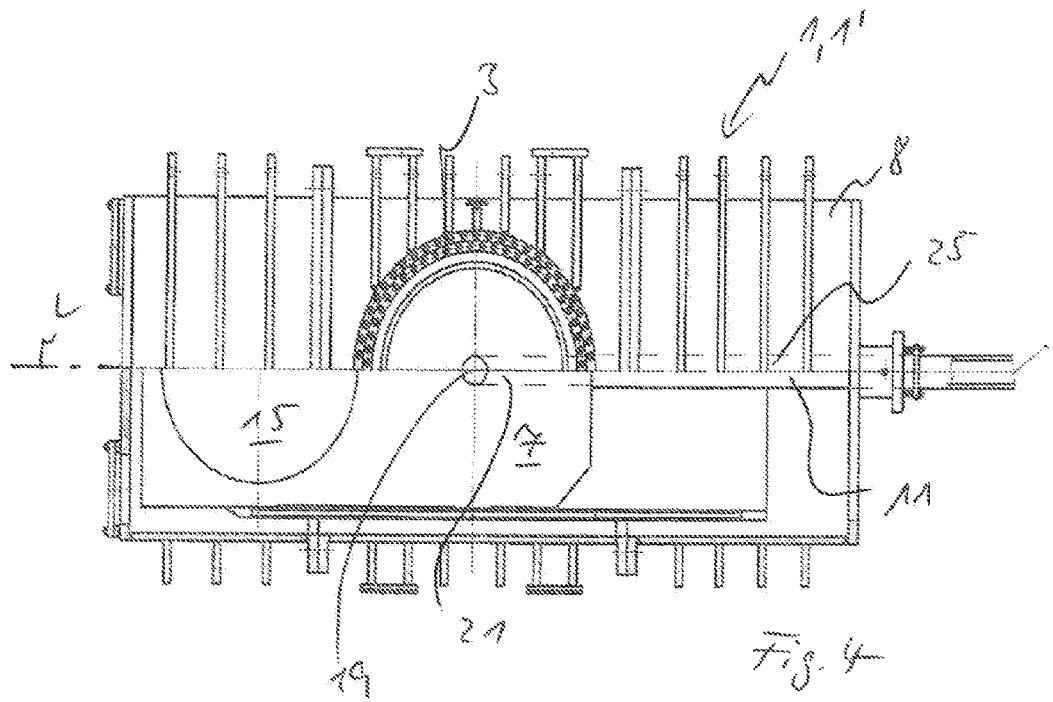
FIG. 4 shows, in diagrammatic form, a shut-off valve having an input opening and a feed channel in accordance with a second embodiment of the invention.

FIG. 4 shows, in diagrammatic form, a shut-off valve having an input opening 19 and a feed channel 21 according to a second embodiment of the invention. There are shown in the top half of the Figure a plan view of the shut-off valve 1, 1' and in the bottom half, in diagrammatic form, a section through the shut-off valve. The shut-off valve shown in FIG. 4 can be either a single-plate gate valve shown in FIG. 1 or a double-plate gate valve shown in FIG. 2.

In contrast to the first embodiment according to FIG. 3, the feed channel 21 in FIG. 4 so extends in the shut-off plate 1, 1' that, on that side of the shut-off part 7 which is remote from the bridging pipe 15, it is in contact with, or can be brought into contact with, the actuating rod 11. The actuating rod 11 preferably comprises a tube element 25, which is in fluid communication with the feed channel 21 and is integrally constructed in the actuating rod 11. Residual materials are fed, by way of the tube element 25, to the feed channel 21, the feed opening 19 and finally the coking drum. Consequently, by this means, the tube element 25 shown in FIG. 3 can be arranged instead in the actuating rod 11, which then fulfills a double function.

Figure 5:
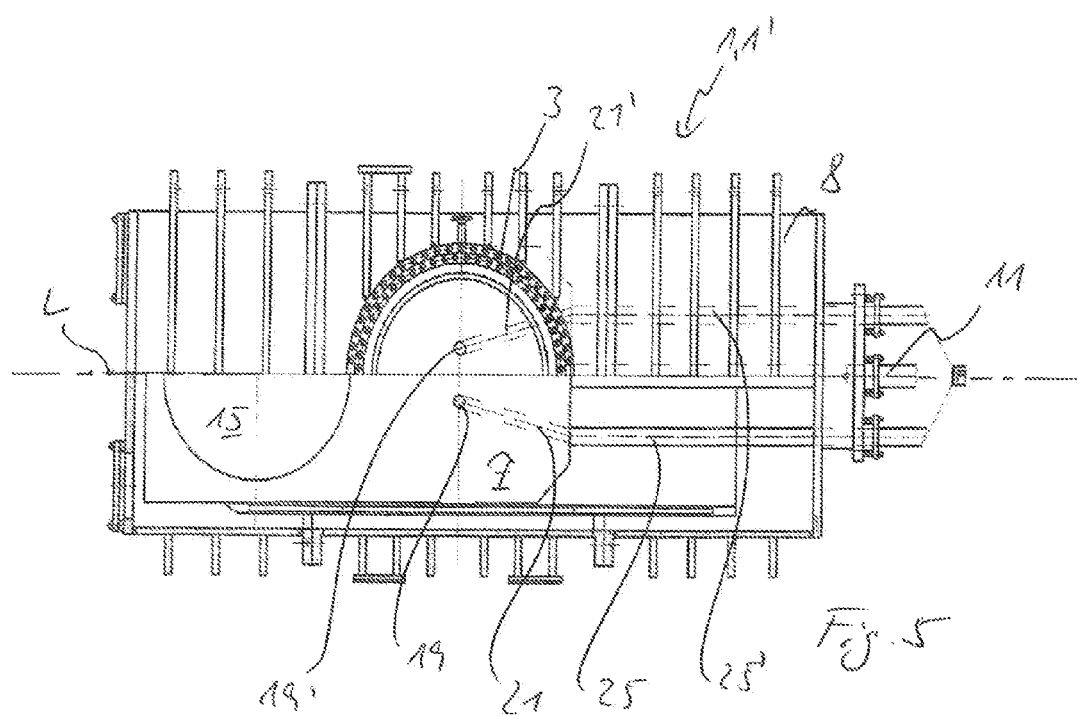
FIG. 5 shows, in diagrammatic form, a shut-off valve having two input openings and two feed channels in accordance with a third embodiment of the invention.

FIG. 5 shows, in diagrammatic form, a modified shut-off valve having two input openings 19, 19' and two feed channels 21, 21' according to a third embodiment of the invention. The shut-off valve is in its closed position in FIG. 5. There are shown in the top half of the Figure a plan view of the shut-off valve 1, 1' and in the bottom half, in diagrammatic form, a section through the shut-off valve. The shut-off valve shown in FIG. 5 can be either a single-plate gate valve shown in FIG. 1 or a double-plate gate valve shown in FIG. 2.

The embodiment shown in FIG. 5 differs from the embodiments shown in FIG. 3 and FIG. 4 in that the shut-off valve 1, 1' according to FIG. 5 has two input openings 19, 19' and two feed channels 21, 21'. Correspondingly, two tube elements 25 and 25' are also provided, which are in fluid communication with the feed channels 21 and 21' formed in the shut-off plate 7, in order to transport residual materials into the coking drum by way of the input openings 19 and 19'.

As in the case of the embodiment according to FIG. 3, the tube elements 25, 25' in FIG. 5 extend substantially parallel to the actuating rod 11 of the shut-off valve 1, 1'. The feed channels 21, 21' are then arranged virtually symmetrically in relation to the actuating rod 11. The two input openings 19 and 19' are arranged in the shut-off plate 7 substantially centrally in relation to the pipe stub 3 and next to one another. The feed channels 21, 21' are, for example, so arranged in the shut-off plate 7 that in the feed direction of the residual materials they form between them an angle which is less than 180°.

Figure 6:
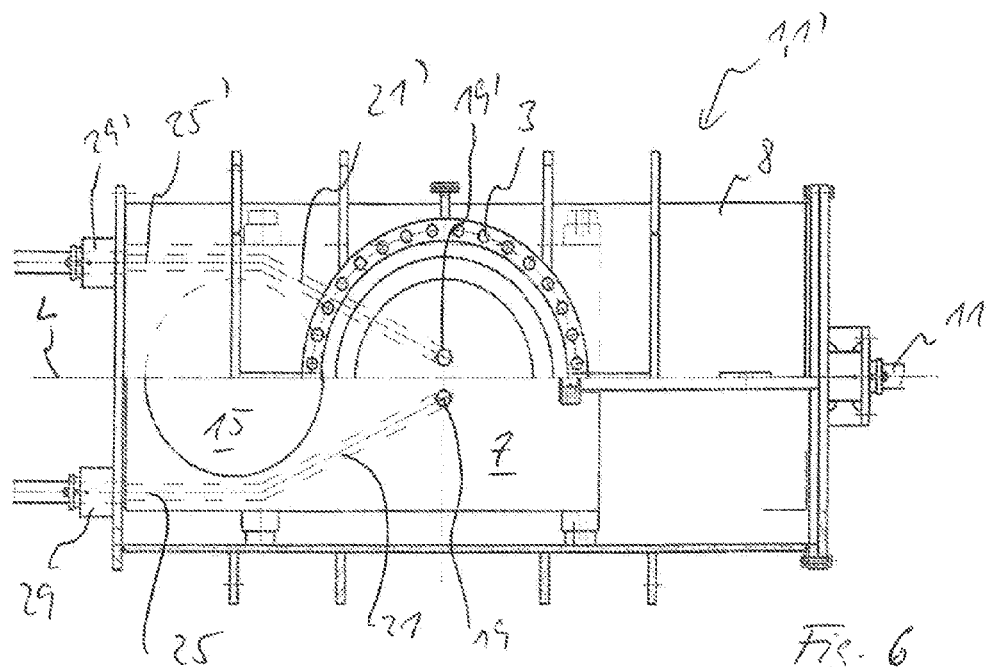
FIG. 6 shows, in diagrammatic form, a shut-off valve having two input openings and two feed channels in accordance with a fourth embodiment of the invention.

FIG. 6 shows, in diagrammatic form, a shut-off valve 1, 1' having two input openings 19, 19' and two feed channels 21, 21' according to a fourth embodiment of the invention. The shut-off valve is in its closed position. There are shown in the top half of the Figure a plan view of the shut-off valve 1, 1' and in the bottom half, in diagrammatic form, a section through the shut-off valve. The shut-off valve shown in FIG. 6 can be either a single-plate gate valve shown in FIG. 1 or a double-plate gate valve shown in FIG. 2.

The embodiment shown in FIG. 6 differs from the embodiment shown in FIG. 5 mainly in that the tube elements 25 and 25' on that side of the shut-off plate 7 which are located opposite the actuating rod 11 are so arranged that additional holders 29, 29' are again necessary in the housing 8 for mounting the tube elements 25, 25'. The feed channels 21, 21' in this case extend on both sides of the bridging pipe 15 in the shut-off plate 7 along the longitudinal direction L. One feed channel 21, 21' is then arranged on each side of the bridging pipe 15. The feed channels are then arranged virtually symmetrically relative to the bridging pipe 15.

Overall it is consequently shown that the present invention makes possible an advantageous homogeneous feed of residual materials into a coking drum, which additionally ensures a homogeneous temperature distribution in the coking drum during the coking process. It will be understood that more than two feed openings can also be provided, each of which is in communication with a feed channel. Provision can also be made for a feed opening to be in communication with more than one feed channel. The crucial aspect is that the feed opening is provided at approximately the same height as the shut-off valve. In this context the feed opening can be provided in the shut-off plate of a bridging-pipe gate valve, in the cylindrical wall of a pipe stub or even in the wall of the coking drum. When a plurality of feed openings is provided, they are preferably arranged symmetrically, especially relative to the pipe stub.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

List of Reference Symbols
1, 1' shut-off valve
3 pipe stub
5 pipe stub
7, 7' shut-off plate
8 housing
9, 9' sealing element
11 actuating rod
15 bridging pipe
17 arrow
19, 19' input opening
21, 21' feed channel
23 internal wedge
25, 25' tube element
27 holder
29 holder
L longitudinal direction That which is claimed:

1. Coking drum for petroleum coke production, the coking drum comprising an approximately cylindrical basic body and at least one inlet opening and outlet opening, a shut-off valve (1, 1') being arranged at least one of the outlet opening and the inlet opening, wherein there is provided at least one input opening (19, 19') for feeding residual materials into the coking drum, wherein the at least one input opening (19, 19') is arranged in the shut-off valve (1, 1').

2. Coking drum according to claim 1, wherein said residual materials are fed into the coking drum from a vacuum distillation process upstream of the coking drum.

3. Coking drum according to claim 1, wherein the at least one input opening (19, 19') is arranged in the shut-off valve (1, 1').

4. Coking drum according to claim 1, wherein the shut-off valve (1, 1') is in the form of a bridging-pipe gate valve having at least one shut-off plate (7, 7').

5. Coking drum according to claim 3, wherein the bridging-pipe gate valve is in the form of a single-plate gate valve having one shut-off plate (7).

6. Coking drum according to claim 3, wherein the at least one input opening (19, 19') is formed in the shut-off plate (7).

7. Coking drum according to claim 4, wherein the bridging-pipe gate valve is in the form of a double-plate gate valve having two parallel shut-off plates (7, 7').

8. Coking drum according to claim 7, wherein the at least one input opening (19, 19') is formed in the shut-off plate (7) that faces the outlet opening of the coking drum.

9. Coking drum according to claim 6, wherein the at least one input opening (19, 19') is in communication with at least one feed channel (21, 21') arranged in the shut-off plate (7).

10. Coking drum according to claim 9, wherein the at least one feed channel (21, 21') extends substantially parallel to the surface of the shut-off plate (7).

11. Coking drum according to claim 8, wherein the at least one feed channel is of a tubular construction.

12. Coking drum according to claim 9, wherein the at least one feed channel (21, 21') is in communication with a vacuum distillation chamber which is upstream of the coking in the coking drum.

\* \* \* \* \*